Oct. 21, 1952 — R. O. CHANDLER — 2,614,889
TIRE, WHEEL, AND HUBCAP LOCK
Filed Nov. 20, 1950 — 3 Sheets-Sheet 1
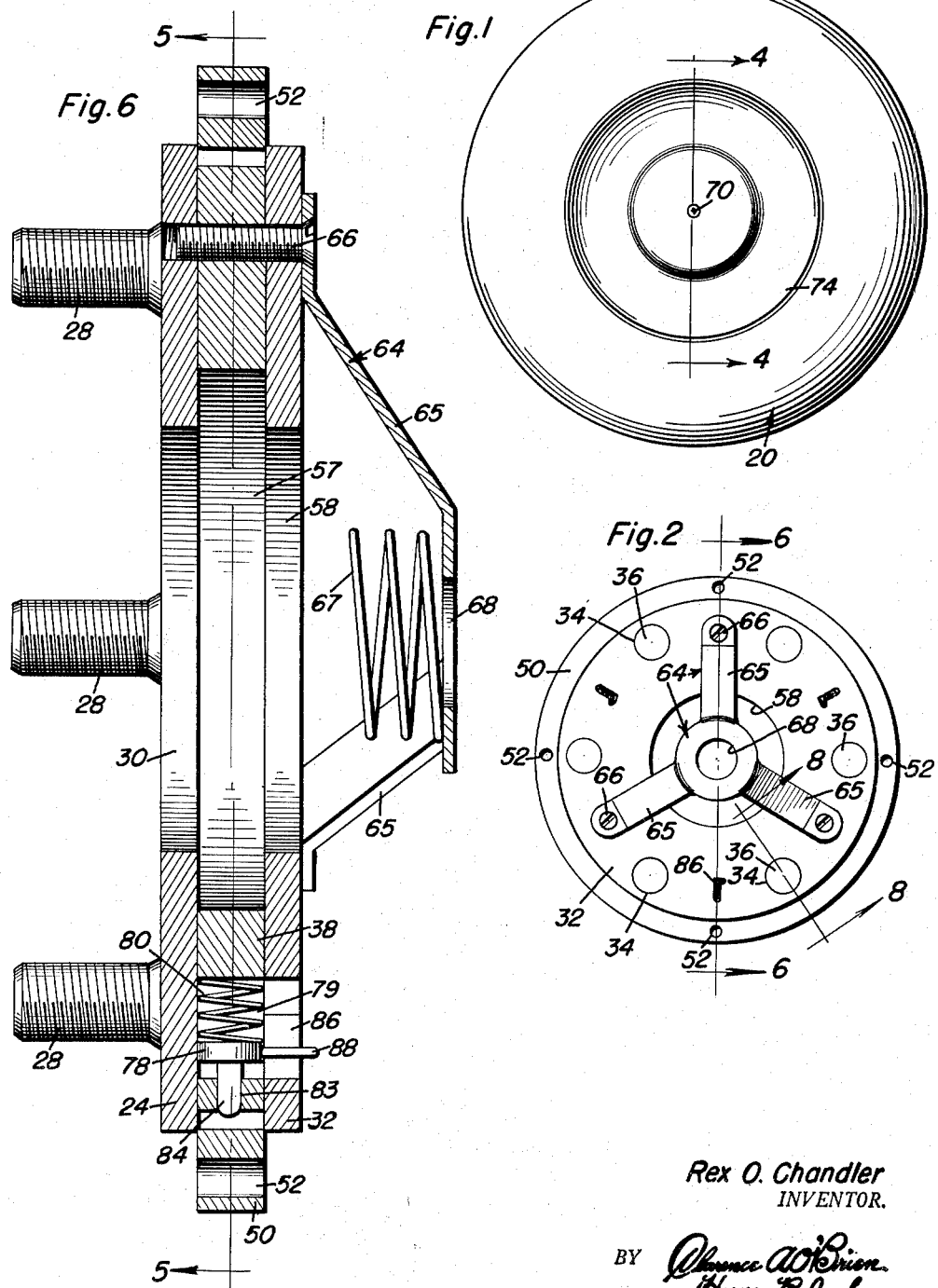
Rex O. Chandler
INVENTOR.
BY Clarence A. O'Brien
and Harvey B. Jacobson
Attorneys Oct. 21, 1952 — R. O. CHANDLER — 2,614,889
TIRE, WHEEL, AND HUBCAP LOCK
Filed Nov. 20, 1950 — 3 Sheets-Sheet 2
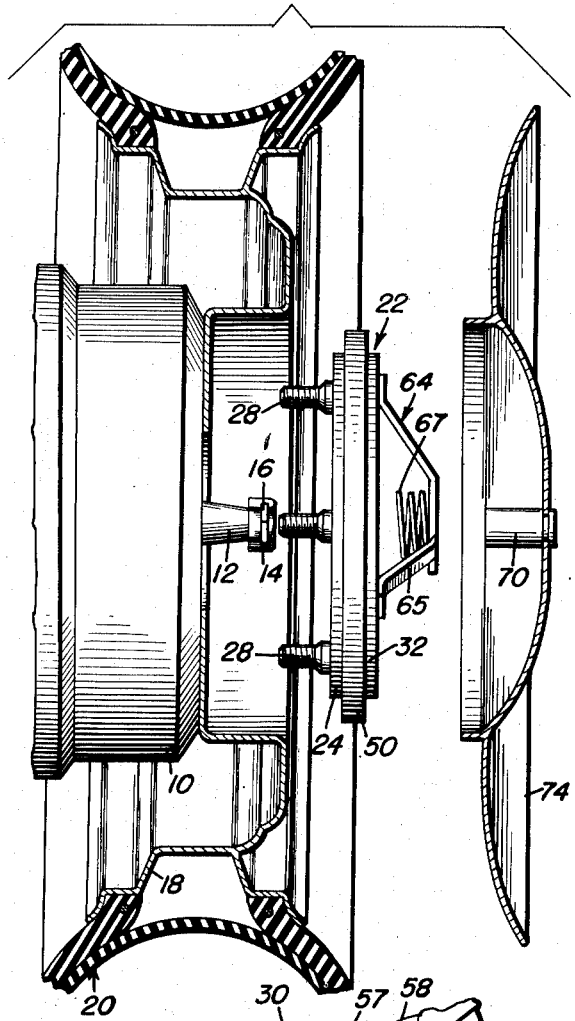
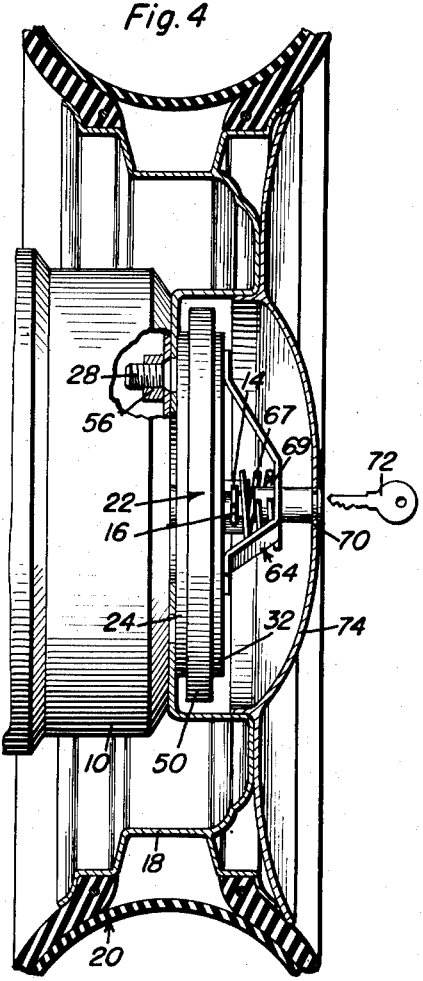
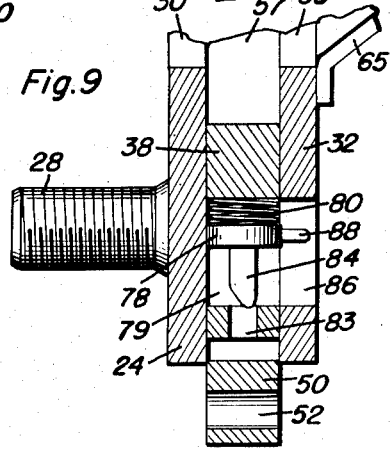
Rex O. Chandler
INVENTOR.

Oct. 21, 1952 — R. O. CHANDLER — 2,614,889
TIRE, WHEEL, AND HUBCAP LOCK
Filed Nov. 20, 1950 — 3 Sheets-Sheet 3
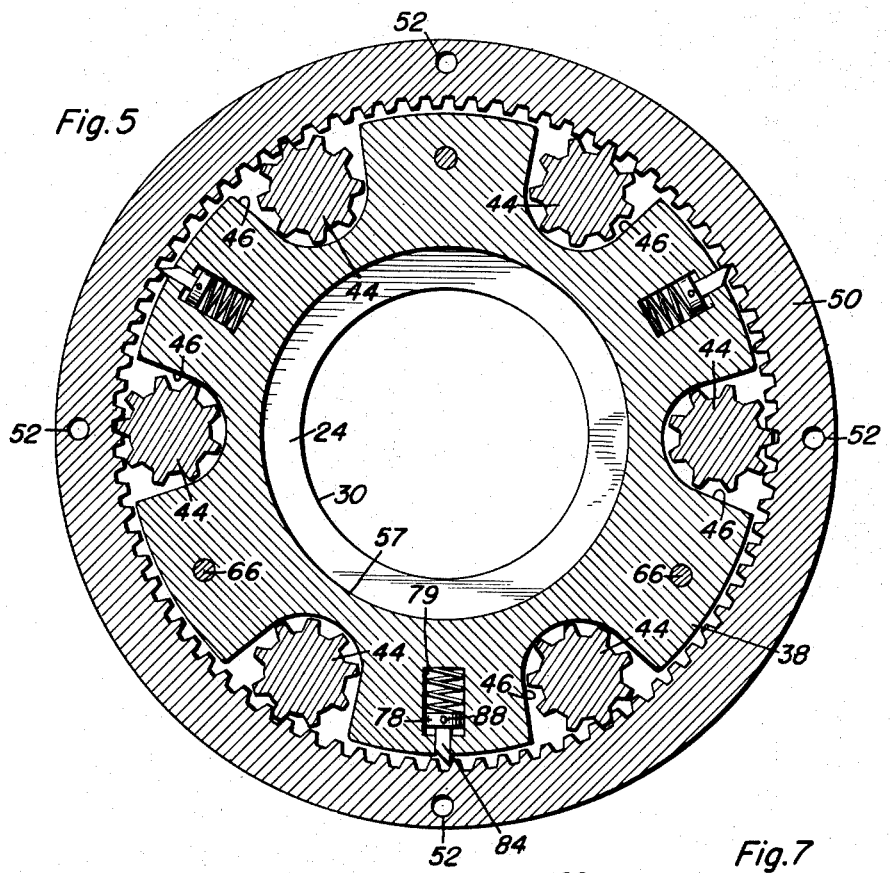
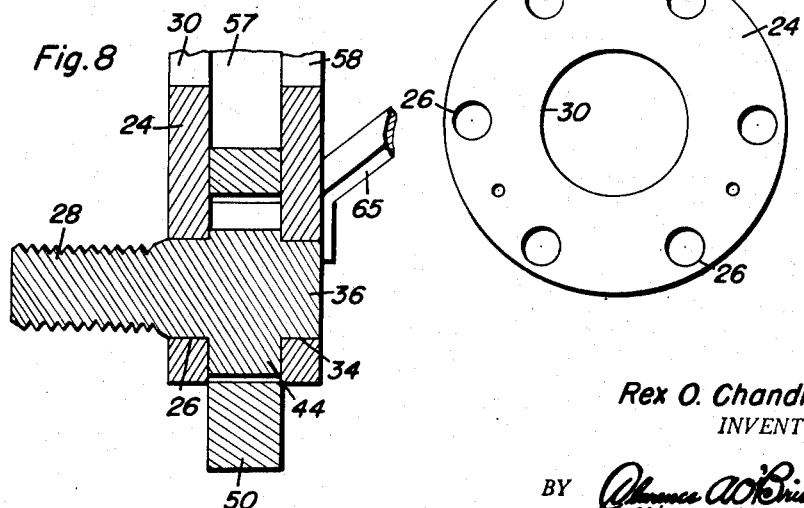
Rex O. Chandler
INVENTOR.
BY *Clarence A. O'Brien*
and *Harvey B. Jacobson*
Attorneys Patented Oct. 21, 1952

2,614,889

UNITED STATES PATENT OFFICE 2,614,889

TIRE, WHEEL, AND HUBCAP LOCK

Rex O. Chandler, Ceredo, W. Va.

Application November 20, 1950, Serial No. 196,619

2 Claims. (Cl. 301—9)

This invention relates to improvements in vehicle parts used in wheel assemblies.

An object of this invention is to provide an attachment for holding the vehicle wheel fixed to the drum of the vehicle, said attachment being a unit which has a number of bolts extending therefrom and which is so constructed that upon operation of a ring gear the bolts are rotated so as to engage appropriate openings in the drum of the wheel assembly for holding the wheel fixed to the drum.

Another object of this invention is to provide an attachment as previously described which has a bracket secured to it constituting a means of receiving a locking device for a hub cap of the wheel assembly.

A further object of this invention is to provide such an attachment with a spring constituting a locking device to prevent separation of the axle nut from the axle.

Other objects and features of importance, as the use of the edges of the hub cap to prevent separation of the tire from the wheel of the vehicle, will become apparent in following the description of the illustrated form of the invention.

In the drawings:

Figure 1 is an elevational view of a standard vehicle wheel having the attachment used thereon;

Figure 2 is a front elevational view of the attachment;

Figure 3 is an exploded vertical sectional view of the wheel construction, parts being shown in elevation;

Figure 4 is an enlarged sectional view taken substantially on the line 4—4 of Figure 1;

Figure 5 is a reduced scale sectional view taken on the line 5—5 of Figure 6 and in the direction of the arrows;

Figure 6 is an enlarged sectional view taken on the line 6—6 of Figure 2;

Figure 7 is an elevational view of the back plate forming a part of the assembly;

Figure 8 is an enlarged sectional view taken on the line 8—8 of Figure 2; and,

Figure 9 is a sectional view showing one of the locking devices which hold the ring gear fixed with respect to the bolt.

In the drawings there is some standard structure shown. There is the brake drum 10, the axle 12 with its axle nut 14 held in place by means of the cotter pin 16, a wheel 18, together with a tire and tube assembly 20.

An attachment or unit 22 is provided for holding the wheel 18 fixed removably to the drum 10.

This attachment includes a back plate 24 provided with a plurality of spaced openings 26 of a size sufficiently large to accommodate the bolts 28. A central opening 30 is provided in the plate 24 to allow the axle 12 to pass therethrough.

A face plate 32 constitutes a part of the attachment 22 and has a plurality of openings 34 therein, the openings 34 being aligned with the openings 26 to accommodate the circular parts 36 of the bolts 28.

An inner plate 38 is disposed between the face plate 32 and the back plate 24 and all of the plates are held assembled by means of the screws 66 which pass through aligned openings in the face plate, inner plate and back plate.

The bolts 28 are of special construction. In lieu of ordinary heads, the bolts have gears 44 constituting the heads of the bolts, the shank portion of the bolts extending from one face of the gear 44 and the circular portion 36 extending from each of the other gears 44. Inasmuch as the circular portion 36 is located in the opening 34 provided for it (Figure 8) and the part of the illustrated bolt 28 between the threads and the nearest face of the gear 44 is located in the opening 26 provided for it, the bolts 28 are mounted for rotation.

In order to provide space within which the gear 44 may rotate freely, the periphery of the inner plate 38 is provided with a plurality of outwardly opening spaced recesses 46.

Means for rotating all of the bolts 28 in unison is provided between the inner plate 24 and the face plate 32 and is held in place for rotation by the outer edges of the back plate 24 and the face plate 32. This means consists of a ring gear 50 which has its teeth engaged with the teeth of the gears 44 of the bolts 28. Accordingly when a tool, for example a spanner wrench, is engaged with the apertures 52 of the ring gear, the ring gear may be rotated thereby causing the gears 44 and hence the bolts 28 to rotate.

In operation the attachment 22 is so arranged that the outer ends of the bolts 28 are located in the threaded apertures 56 of the hub 10 and the axle 12 with its nut 14 is allowed to pass through the central openings 30 as well as the central openings 57 and 58 formed respectively in the inner plate 57 and the face plate 58. A spanner wrench or other suitable tool is engaged with the ring gear 50 and the ring gear is rotated thereby causing rotation of the studs 28. Inasmuch as the studs are located in such position as to be capable of being threaded in the internally threaded openings 56, the attachment is fixed firmly in place on the wheel, the inner surface of the plate 24 contacting the wheel and pulling it firmly in place on the hub 10.

A bracket 64 which includes a number of arms 65, is held fixed in place on the outside surface of the face plate 32. Standard screws 66 which are threaded in openings in the plates, hold the spider-type bracket 64 fixed in place with respect to the plates. There is a spring 67 carried by the bracket and arranged to contact the axle nut 14 to prevent it from separating from the axle 12. This spring may be made sufficiently long so as to encircle a part of the nut frictionally holding it in place and also holding the cotter pin 16 so as to prevent it from separating from the axle 12 and nut 14 assembly.

An aperture 68 is provided centrally in the bracket 64 in order to accommodate the latch keeper 69 (Figure 4) which is arranged to be projected from the barrel 70 of the lock upon operation of the lock by means of a key 72.

The barrel 70 is carried by a hub cap 74 which is of sufficient size to cover the entire wheel outer surface and the bead of the tire on the wheel.

By the above described structure, it is impossible to separate the wheel from the vehicle unless the hub cap is removed. Since the hub cap cannot be removed without unlocking it, an anti-theft device results.

Moreover, the tire cannot be separated from the rim inasmuch as the outer edges of the hub cap overlie the bead of the tire and also a part of the tire close to the bead. Hence, the lock serves the dual function of holding the hub cap in place to prevent unauthorized operation of the attachment 22 and to prevent unauthorized separation of the tire from the wheel without removing the hub cap 74.

In order to insure that after the attachment 22 is so disposed as to hold the wheel 18 on the drum 10, the bolts 28 will not rotate, a plurality of locking devices are provided. Each locking device consists of a piston or plunger 78 mounted for reciprocation in a cylinder 79, which is formed in the inner plate 38. There is a spring 80 having one end contacting the inner end of the cylinder 79 and the other end contacting the head of the plunger or piston 78, constantly pushing the plunger outwardly of the cylinder. A passage 83 is formed in the inner plate 38 to accommodate the keeper 84 which is in the form of a rod having a beveled end portion so as to ratchet over the teeth of the ring gear 50 when the ring gear is rotated in one direction. However when the ring gear is rotated in the opposite direction and the beveled end of the keeper 84 engaged with the teeth of the ring gear 50, the ring gear cannot rotate.

A bayonet slot 86 is formed in the face plate 32 and has a pin 88 passed therethrough. The inner end of this pin is fixed to the piston 78 so that the pin may be lifted and rotated to separate the keeper 84 from the teeth of the ring gear 50. Then, the pin 88 may be rotated so as to become located upon the land of the bayonet slot 86. This holds the piston 78 inwardly of the cylinder 79 and against the compressive force of the spring 80. By moving the pin 88 slightly, it becomes separated from the land of the slot 86 whereby the spring 80 presses the piston 78 outwardly of the cylinder 79 so that the keeper 84 engages in the teeth of the ring gear 50.

One or more of the described locking devices may be used, as found desirable or necessary. Although one locking device would serve the purpose intended, the utility of several locking devices insures proper locking effect.

It is now standard practice to retain a vehicle wheel on its drum by means of bolts or studs and nuts. Even with the expedient of reverse threading the wheel sometimes becomes separated from its drum thereby causing accidents. In use of the described device, the wheel cannot work its way loose by road shocks and the like. Accordingly, accidental wheel separation from the vehicle is avoided.

Having described the invention, what is claimed as new is:

1. In a vehicle wheel construction which includes a drum with threaded apertures, and a wheel, an attachment to fasten the wheel to the drum, said attachment comprising a back plate having a plurality of spaced openings, bolts disposed in said openings, each bolt having a head with teeth on the periphery thereof, said bolts being threadedly disposed in said apertures and a ring gear disposed in engagement with the teeth of said bolts so that when said ring gear is rotated, said bolts are rotated, a face plate, an inner plate located between said back plate and said face plate, means holding said plates assembled, said inner plate having outwardly opening recesses therein within which said heads are located, said ring gear being concentrically located with respect to said inner plate and having means to accommodate a tool to rotate said ring gear, locking devices carried by said inner plate and engaging said ring gear to prevent rotation of said ring gear, and means operatively connected with said locking devices and said face plate for releasably holding said locking devices released from said ring gear.

2. An attachment to hold a wheel on a brake drum and to hold a hub cap connected with the wheel, said attachment comprising a back plate with a plurality of openings therein, a face plate, an inner plate disposed between said face plate and said back plate, means holding said plates assembled, said inner plate having openings aligned with the openings in said back plate, bolts mounted for rotation in pairs of said aligned openings, gears constituting heads of said bolts, and a ring gear with teeth engaging the teeth of said gears to rotate all of said bolts in unison, said ring gear being arranged on the inner periphery of said inner plate and held in place by portions of said face plate and back plate which overlie parts of said ring gear, and said ring gear having tool accommodating means to rotate the ring gear, which tool accommodating means are accessible from the front face of said ring gear.

REX O. CHANDLER.

REFERENCES CITED

The following references are of record in the file of this patent:

UNITED STATES PATENTS

| Number | Name | Date |
| --- | --- | --- |
| 1,675,630 | Ash | July 3, 1928 |
| 1,947,178 | Wilson | Feb. 13, 1934 |
| 2,042,774 | Ferro | June 2, 1936 |
| 2,191,081 | Menken | Feb. 20, 1940 |
| 2,328,301 | Shaw | Aug. 31, 1943 |

FOREIGN PATENTS

| Number | Country | Date |
| --- | --- | --- |
| 270,131 | Great Britain | May 5, 1927 |